US005277572A

United States Patent [19]

Trent et al.

[11] Patent Number: 5,277,572

[45] Date of Patent: Jan. 11, 1994

[54] DENSIFIER FOR DENSIFYING COATED PAPER

[75] Inventors: James W. Trent, Rockford; Vernon L. Lamb, Sparta, both of Mich.

[73] Assignee: Montcalm Fibre Corporation, Grand Rapids, Mich.

[21] Appl. No.: 882,450

[22] Filed: May 12, 1992

[51] Int. Cl.[5] .............. B29C 47/52

[52] U.S. Cl. .............. 425/331; 264/118; 264/140; 264/DIG. 69; 425/DIG. 230

[58] Field of Search ...... 425/331, DIG. 230; 264/115, 264/118, 140, 141, DIG. 69

[56] References Cited

U.S. PATENT DOCUMENTS

| | | | |
|---|---|---|---|
| 2,178,009 | 10/1939 | Helm . | |
| 2,621,364 | 12/1952 | Stillman | 425/145 |
| 2,984,192 | 5/1961 | Wald . | |
| 3,045,613 | 7/1962 | Kennedy . | |
| 3,134,344 | 5/1964 | Lundell . | |
| 3,166,026 | 1/1965 | Crane . | |
| 3,174,441 | 3/1965 | Lundell . | |
| 3,177,045 | 4/1965 | Lundell . | |
| 3,180,287 | 4/1965 | Lundell . | |
| 3,203,366 | 8/1965 | Lundell . | |
| 3,230,904 | 1/1966 | Lundell . | |
| 3,253,557 | 5/1966 | Lundell . | |

*Primary Examiner*—Mary Lynn Theisen

*Attorney, Agent, or Firm*—Warner, Norcross & Judd

[57] ABSTRACT

A radial die densifier is disclosed having a means for regulating the rate of material flow. Material passes through a feed cylinder in which is disposed a distributor cone. The feed cylinder may be moved toward and away from the cone so as to vary the width of a flow passage way formed between the end of the feed cylinder and the distributor cone. Also disclosed is a method for producing fuel pellets, logs, or the like, by densifying paper coated with a moisture resistant material in which the coating acts as a binder and a combustibility enhancing agent.

17 Claims, 3 Drawing Sheets

DENSIFIER FOR DENSIFYING COATED PAPER

BACKGROUND OF THE INVENTION

1. Field of the Invention

The invention relates to an apparatus for densifying materials for the production of pellets, logs, or the like. The present invention further relates to a method for densifying coated paper for the production of fuel pellets, logs, or the like.

2. Description of the Related Art

Various densifier apparatus are known in which material is forced through radially extending openings in a die ring by the action of press rollers. In a typical apparatus, two or more press rollers are mounted for rotation inside a die ring. The circumferences of the press rollers roll along the inner circumference of the die ring. The die ring is formed with a number of radially directed openings. Material introduced within the die ring is forced through the openings by the press rollers, thereby forming densified pellets, logs, or the like.

The material to be densified by such apparatus may vary widely in properties such as consistency, particle size, and cohesion. Accordingly, there is a need to regulate the rate at which the material flows into the die ring.

High fuel costs for generating electricity and heating have brought about a need for alternative energy sources. At the same time, ecological concerns have focused on the need to recycle or utilize scrap to the greatest possible extent. Processes for converting scrap material into fuel are, therefore, of great interest.

One type of scrap material available in large quantities is coated paper. Typically, such paper is coated with wax or polyethylene to render the paper impermeable to moisture. While coated paper is highly combustible, paper in sheet form burns rapidly at a rate that is difficult to control. Accordingly, there is a need for a process to convert coated paper waste to a form suitable for use as a fuel source.

It is known to make combustible fuel pellets, fireplace logs, and the like by densifying cellulosic materials such as paper and wood fiber. The materials are first ground or shredded, then a binding agent, such as a wax, is added. The mixture is densified to produce the pellets. Such a method is disadvantageous insofar as it requires the addition of a binding agent. Accordingly, there is a need for such a method in which no additional binding agent is required.

SUMMARY OF THE INVENTION

The present invention satisfies the aforementioned needs by providing a densifier in which the rate of material flow to a radial die ring is regulated by the use of a feed cylinder and an internal distributor cone. The feed cylinder and the distributor cone are axially movable with respect to each other such that the size of an annular opening between the cylinder and the cone may be varied according to the nature of the material being fed and the desired flow rate.

In a first preferred embodiment the densifier is oriented axially vertically with the material fed from above the die ring. The distributor cone is spaced above the press rollers extending generally within the lower extent of the feed cylinder. The material passes between the lower circumferences of the cone and feed cylinder. The feed cylinder is mounted so that it may be moved up and down to vary the size of the passageway formed between the two lower circumferences.

In a second preferred embodiment, the densifier is oriented axially horizontally, and an auger is used to transport material into the feed cylinder and urge the material past the cone and into the die ring.

The present invention further satisfies the aforementioned needs by providing a process for converting coated paper waste into pelletized fuel. According to the invention, paper having a moisture impermeable coating such as wax or polyethylene is first shredded, chopped, or ground into particulate form. Second, the shredded paper is densified into pellets. The coating material acts as a binder and as a flammability enhancer.

The pelletized fuel made by the process of the invention may be used in the cogeneration of electrical power. Furthermore, the pellets may be consolidated to form artificial fireplace logs or used in stoves to produce residential heat.

These and other objects, advantages, and features of the present invention will be more fully understood and appreciated by reference to the written specification and appended drawings.

DESCRIPTION OF THE PREFERRED EMBODIMENT

Figure 1:
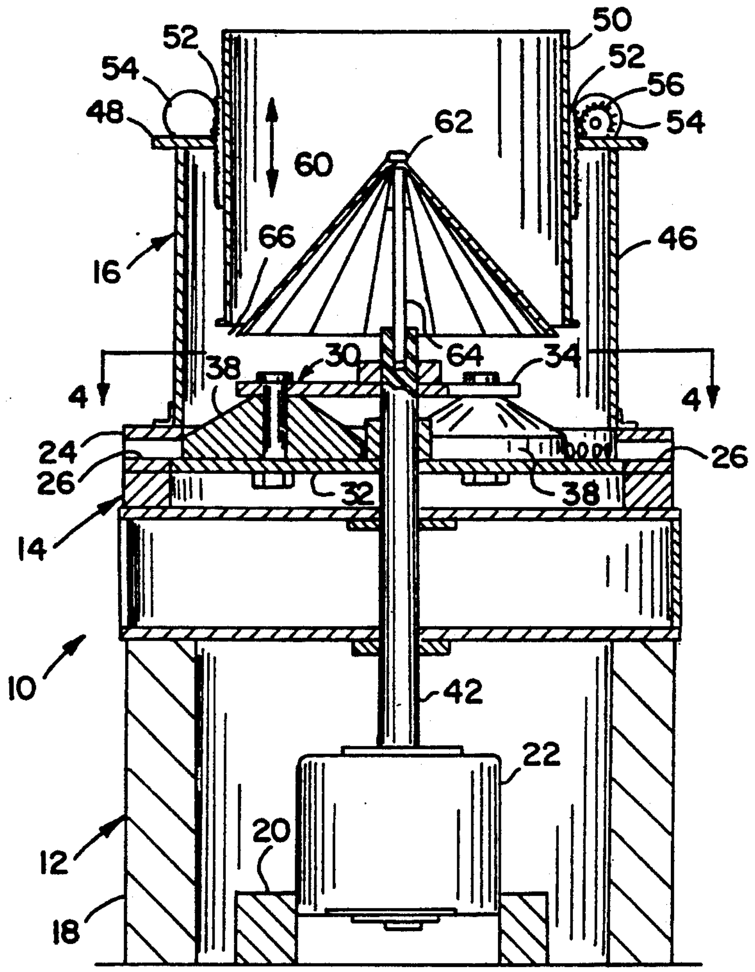
FIG. 1 is a side view, with parts in vertical section, of a densifier according to the principles of the invention.

By way of disclosing a preferred embodiment, and not by way of limitation, there is shown in FIG. 1 a densifier 10 which includes in its general organization a base 12, a radial die press section 14, and a feed section 16. In this embodiment, the densifier is oriented axially vertically such that the die press section is supported above the base, and the feed section is supported above the die press section.

The base section 12 includes any suitable support or foundation 18 and a mounting 20 for a motor 22 or other suitable source of rotational drive such as gears or belts and pulleys.

Figure 4:
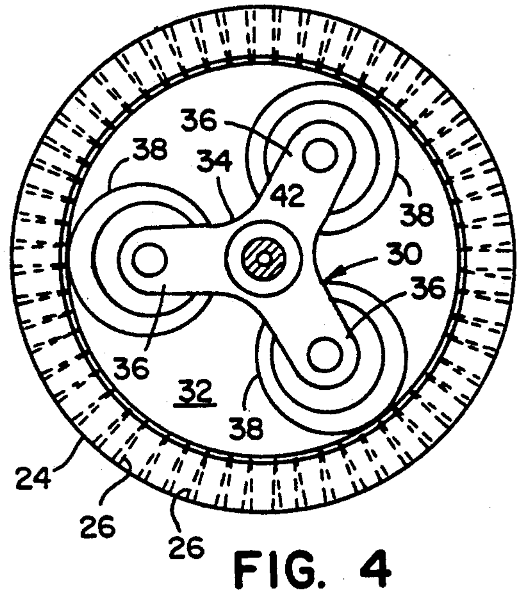
FIG. 4 is a sectional view taken along the line 4—4 of FIG. 1.

The radial die press section 14 includes an annular die ring 24 through which are formed a plurality of die openings 26. As best shown in FIG. 4, the die openings 26 are closely spaced and oriented radially.

As shown in FIGS. 1 and 4, there is disposed generally within the inner circumference of the die ring a rotary press assembly 30. The press assembly 30 includes a circular floor plate 32 having its upper surface disposed just below the lower extents of the die openings 26. Spaced above the floor plate 32 there is a retainer plate 34 having three radially extending arms 36. The press assembly 30 further includes three press rollers 38, each of which is journalled between the floor plate 32 and one of the retainer plate arms 36. The press rollers 38 are disposed with their circumferential walls closely spaced from, or in contact with, the inner circumference of the die ring 24.

A drive shaft 42 extends upward from the motor 22, through the base 12, and through central openings in the press assembly floor plate 32 and retainer plate 34. The floor plate 32 and retainer plate 34 are fixed to the shaft 42 so that they are drivingly rotated by the motor 22.

Figure 3:
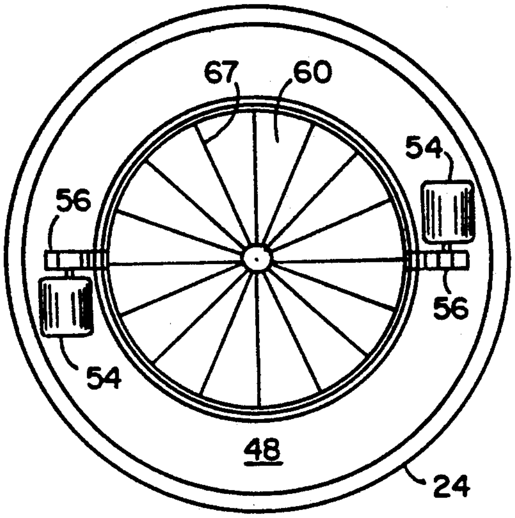
FIG. 3 is a top view of the densifier of FIG. 1.

As shown in FIGS. 1 and 3, the feed section 16 of the densifier includes an outer cylinder 46 which, at its lower end, is affixed to the die ring 24. The inner diameter of the outer cylinder 46 is approximately the same as the inner diameter of the die ring. At the upper end of the outer cylinder 46 there is affixed an annular support ring 48. Within the outer cylinder 46 is disposed a feed cylinder 50. The feed cylinder is coaxial with the outer cylinder 46 and the drive shaft 42, and has an outer diameter somewhat less than the inner diameter of the support ring 48.

At diametrically opposite extents of the feed cylinder 50, gear racks 52 are mounted to the outer surface of the feed cylinder adjacent the support ring 48. Motors 54 are mounted to the support ring 48 at locations corresponding to the racks 52. The shafts of the motors 54 include pinions 56 which drivingly engage the racks 52. Thus, by activating the motors 54, the feed cylinder 50 may be moved axially up or down. Other suitable means for moving the feed cylinder may be employed, such as pneumatic cylinders.

A drive shaft extension 64 extends coaxially upwardly from the upper end of the drive shaft 42 and is fixed for co-rotation with the drive shaft. The upper end of the drive shaft extension is disposed within the interior of the feed cylinder.

A downwardly and outwardly sloping distributor cone 60 is affixed at its apex 62 to the upper end of the drive shaft extension 64 for co-rotation with the drive shaft 42. The upper surface of the cone is formed with ribs 67, or vanes or the like, which agitate and break up the material being fed to facilitate the flow of the material. The base of the cone is spaced apart above the die ring.

The upper, or apical extent of the distributor cone is disposed generally within the interior of the feed cylinder 50. The diameter of the base circumference of the cone is somewhat less than the inner diameter of the feed cylinder. Thus, a generally annular passageway 66 is formed between the lower end of the feed cylinder 50 and the distributor cone.

In operation, the material to be densified, such as ground or shredded paper, is loaded into the open upper end of the feed cylinder 50. The material passes downwardly between the distributor cone 60 and the feed cylinder 50 and through passageway 66. The distributor cone is drivingly rotated by motor 22 and shafts 42 and 64, with the ribs 66 aiding the flow of the material through the passageway 66.

The material falls from the passageway 66 onto the floor plate 32 within the interior of the die ring 24. The press wheels, which are rolling against the inner circumferential wall of the die ring, forcibly press the material outwardly through the die ring openings, thus densifying the material and forming pellets, logs, wafers, or the like.

Figure 2:
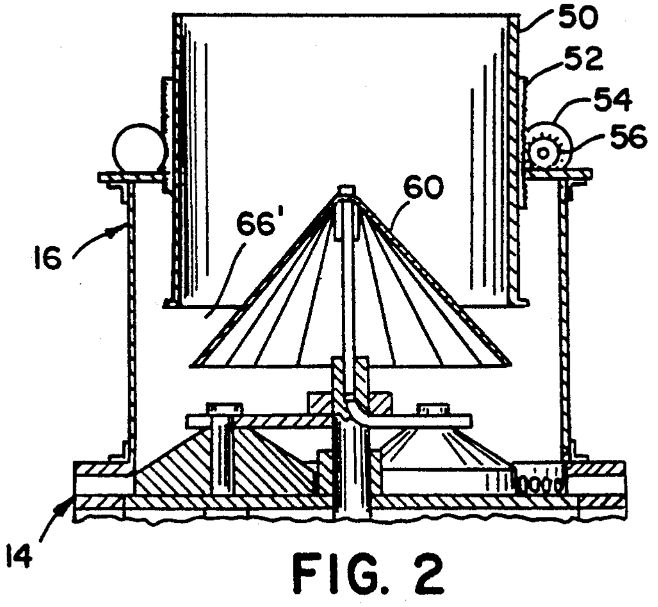
FIG. 2 is a fragmentary side view, with parts in vertical section, of the upper portion of the densifier of FIG. 1 shown with the feed cylinder in a raised position.

The rate of flow of the material may be varied by increasing or decreasing the size of the passageway 66. As shown in FIG. 2, motors 54 have been activated to cause pinions 56 and racks 52 to lift the feed cylinder 50. The relative axial movement between the feed cylinder and the distributor cone 60 causes the passageway to widen as at 66'. The flow rate of material through the passageway is thus increased. Alternatively, the feed cylinder and distributor cone may be moved closer to each other to decrease the size of the passageway and decrease the material flow rate.

Figure 5A:
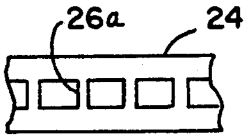
FIGS. 5*a*–5*c* are fragmentary side views of the outer circumference of the die ring illustrating alternate die opening shapes.
Figure 5B:
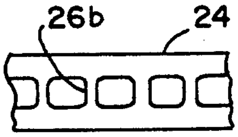
Figure 5C:
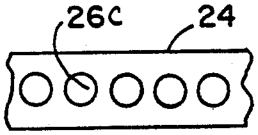

FIGS. 5*a*–5*c* show alternate forms for the die openings 26 of the die ring 24. In FIG. 5*a*, the openings 26*a* are square. This shape provides for close spacing of the openings and maximum cross-sectional area for the passage of material. In FIG. 5*b*, the openings are generally square with rounded corners, a shape which may be closely spaced and which will form more smoothly formed pellets or logs. In FIG. 5*c*, the openings are circular to form cylindrical pellets or logs.

Figure 6:
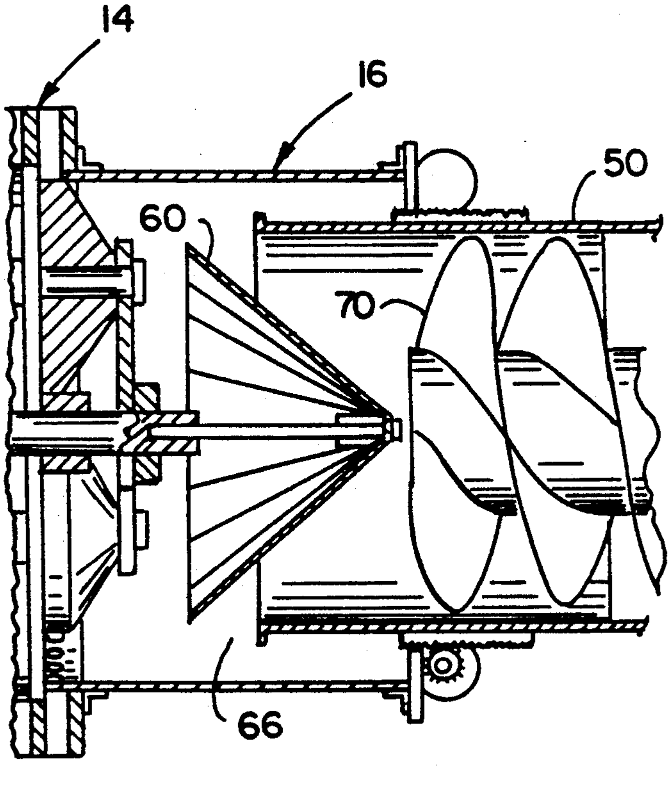
FIG. 6 is a fragmentary side view, with parts in vertical section, of an alternate preferred embodiment of the densifier.

FIG. 6 shows an alternate embodiment in which the densifier is oriented axially horizontally. In this embodiment, the components of the densifier such as the die press section 14 and the feed section 16 have their common axes disposed horizontally. An auger 70 having an end disposed within the feed cylinder 50 is used to transport material through the passageway 66 to the die press section 14. The feed cylinder 50 is movable with respect to the distributor cone 60 to vary the size of the passageway.

Figure 7:
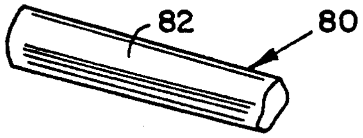
FIG. 7 is a perspective view of a roll covered with coated paper suitable for use as material in the method of the invention.

FIGS. 7–10 illustrate the method of the invention in which fuel pellets are formed from coated paper. As shown in FIG. 7, suitable source of coated paper is a kraft paper wrapper 82 used to protect a coiled web of newsprint and which might otherwise be discarded as scrap. Such paper is coated with a substance to make the paper moisture resistant. The coating substance may be a wax, but is more typically a polymeric material such as polyethylene. The coating material is suitable for use as a binder to form densified fuel pellets from the wrapper 82 and to enhance the combustibility of the pellets.

Figure 8:
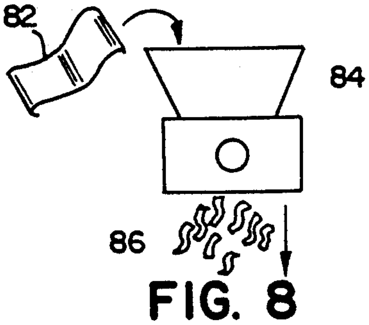
FIG. 8 shows the step of shredding or grinding material according to the method of the invention.
Figure 9:
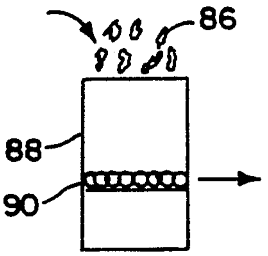
FIG. 9 shows the step of densifying according to the method of the invention.
Figure 10:
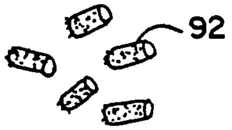
FIG. 10 shows fuel pellets resulting from the method of the invention.

As shown in FIG. 8, the coated paper wrapper 82 is fed into a grinder or shredder 84 and is converted to shreds 86 or particles of suitable size and shape. As shown in FIG. 9, the shreds 86 are then fed into a densifier 88 which may be a densifier such as described above with respect to FIG. 1. The material emerges through the openings of die ring 90 as the burnable fuel pellets 92 or logs shown in FIG. 10. The coating material acts as binding agent which maintains the paper material in pellet or log form. Furthermore, the coating material enhances the combustibility of the pellets or logs.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A densifier comprising:
a radial die press having a die ring disposed about a central axis and drivingly rotated press rollers disposed within said die ring;
a feed cylinder disposed coaxially with said die ring and having an end spaced apart from said die ring;
a distributor cone disposed coaxially with said feed cylinder, said distributor cone having its apex disposed within said feed cylinder, thereby forming a material flow passageway between said feed cylinder end and said cone;
said distributor cone and said feed cylinder being supported for relative axial movement therebetween, whereby the size of the material flow passageway may be varied.

2. The densifier of claim 1 further comprising a drivingly rotated axial shaft, said press rollers and said distributor cone being mounted to said shaft for co-rotation therewith.

3. The densifier of claim 2 wherein said distributor cone includes rib means for aiding the flow of material through said material flow passageway.

4. The densifier of claim 1 wherein said feed cylinder is mounted for axial movement toward and away from said die ring.

5. The densifier of claim 1 wherein said axis is disposed vertically.

6. The densifier of claim 1 wherein said axis is disposed horizontally.

7. The densifier of claim 1 further comprising an auger disposed within said feed cylinder for transporting material toward said die press.

8. A densifier for producing pellets, and logs, said densifier comprising:
a radial die press having a central axis and including a die ring formed with a plurality of radially extending openings and at least one press roller mounted for rolling along the inner circumference of said die ring and forcing material through said openings;
a feed cylinder disposed coaxially with said die press and having an end spaced apart from said die ring;
a distributor cone disposed coaxially with said die press and having its base spaced apart from said die press and its apical extent disposed within said feed cylinder, whereby a passageway is formed between said end of said feed cylinder and said distributor cone through which material may flow to said die ring;
means for mounting said distributor cone and said feed cylinder for relative axial movement therebetween, whereby the size of said passageway may be varied to regulate the flow of material therethrough.

9. The densifier of claim 8 wherein said means for mounting comprises means for moving said feed cylinder toward and away from said die ring.

10. The densifier of claim 9 wherein said passageway is widened when said feed cylinder is moved away from said die ring and narrowed when said feed cylinder is moved toward said die ring.

11. The densifier of claim 8 further including an axial drive shaft for drivingly rotating said press rollers.

12. The densifier of claim 11 wherein said shaft extends into said feed cylinder and said distributor cone is affixed to said shaft for co-rotation therewith.

13. The densifier of claim 12 wherein said distributor cone is formed with rib means for facilitating the flow of material through said passageway.

14. The densifier of claim 8 wherein said axis extends vertically.

15. The densifier of claim 8 wherein said axis extends horizontally.

16. The densifier of claim 15 further comprising an auger means disposed within said feed cylinder for transporting material toward said die press.

17. The densifier of claim 8 wherein said radially extending openings are square.

* * * * *